United States Patent [19]

Chanton

[11] 4,443,165
[45] Apr. 17, 1984

[54] MOINEAU PUMP WITH HELICOIDAL COUPLING SLEEVE

[75] Inventor: Edmond Chanton, Clamart, France

[73] Assignee: Societe Generale de Mecanique et de Metallurgie, France

[21] Appl. No.: 338,833

[22] Filed: Jan. 12, 1982

[30] Foreign Application Priority Data

Jan. 19, 1981 [FR] France .................................. 81 00904

[51] Int. Cl.³ ......................... F04C 2/00; F04C 15/00; F16B 2/10; F16B 7/04
[52] U.S. Cl. ..................................... 418/48; 418/182; 403/302; 403/313
[58] Field of Search ................... 418/48, 182; 403/302, 403/309, 312, 313

[56] References Cited

U.S. PATENT DOCUMENTS 2,028,407 1/1936 Moineau ................................. 418/48
2,739,650 3/1956 Hill ......................................... 418/48
3,879,147 4/1975 Morell ................................... 403/409

FOREIGN PATENT DOCUMENTS 2215476 10/1973 Fed. Rep. of Germany ........ 418/48
1275697 10/1961 France ................................. 418/48
250223 12/1926 United Kingdom ................ 403/313

Primary Examiner—John J. Vrablik
Attorney, Agent, or Firm—Larson and Taylor

[57] ABSTRACT

The invention relates to improvements in or to Moineau pumps comprising a stator having an axial cavity, a helicoidal rotor adapted to rotate in said cavity of the stator by cooperating with it and coupling means to couple the rotor to another driving or driven rotary member. The helicoidal rotor projects axially out of the stator and the coupling means comprise a rigid and elongated coupling sleeve, hollowed by an axial housing of which the shape is complementary to that of the helix of the rotor, said sleeve being engaged on and gripping the end of the rotor projecting out of the stator.

8 Claims, 2 Drawing Figures

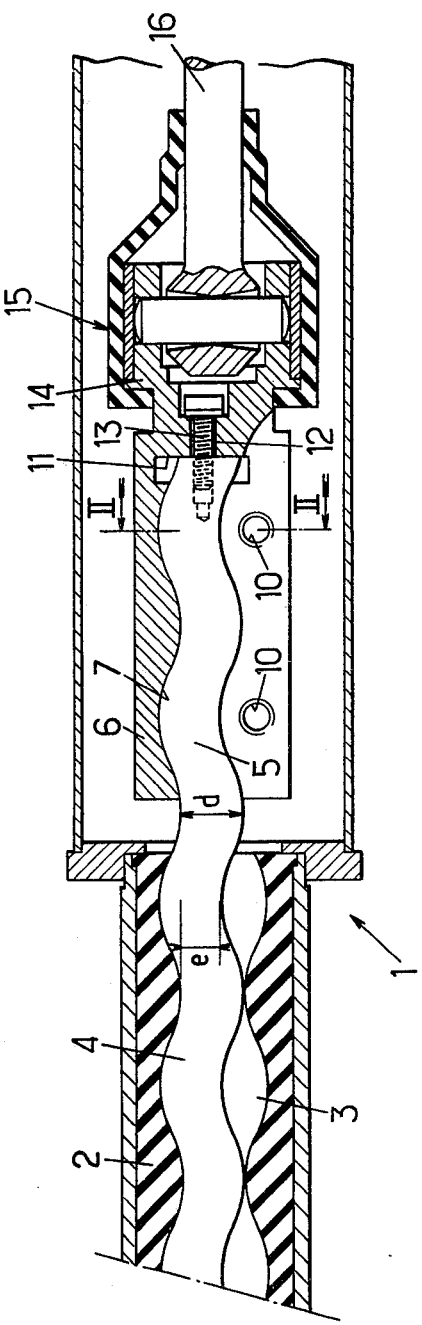
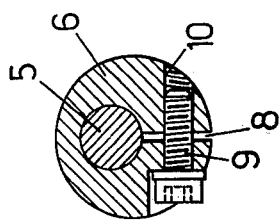
FIG.1.
FIG.2.

MOINEAU PUMP WITH HELICOIDAL COUPLING SLEEVE

The present invention relates to improvements in or to gear pumps called Moineau pumps, comprising a stator having an axial cavity, a helicoidal rotor adapted to rotate in said cavity of the stator cooperating with it and coupling means to couple the rotor to another driving or driven rotary member.

In certain pumps whose rotor possesses a relatively small transverse dimension with a helical undulation of relatively large depth, the portion of the rotor useful for the transmission of the torque—that is to say, the cylindrical region of revolution enveloped by the undulation bottoms—have too small a radius and hence does not offer sufficient mechanical strength taking into account the torque that it must transmit. As a result it is not possible then to couple the rotor to another rotary member (such as a rotary drive member) in the customary manner, that is to say by providing a coupling flange at the end of the rotor.

The invention is essentially for the purpose of overcoming this drawback and of providing a coupling between the rotor and another rotary member, which, in the case considered, averts any risk of breakage of the rotor.

To this end, it is provided, according to the invention, for the helicoidal rotor to project axially outside of the stator and for the coupling means to comprise a rigid and elongated coupling sleeve, hollowed by an axial housing whose shape is complementary with that of the helix of the rotor, said sleeve being engaged on and gripping the end of the rotor projecting from this stator.

Due to this arrangement, the torque transmitted between the rotary member and the rotor, particularly the drive torque for rotating the rotor, is applied to the rotor at the periphery of the latter, over its entire outer surface gripped by the coupling sleeve: it is hence the totality of the zone of the rotor gripped by the coupling sleeve which is stressed, and no longer only the central cylindrical region enveloped by the undulation bottoms.

On the other hand, advantage is taken of the presence of the helix of the rotor to fasten the projecting end of the rotor and the sleeve rigidly into one another by screwing.

However, taking into account the relatively complex shape of the helix of the rotor, there is provided in the sleeve, to facilitate the positioning of the sleeve on the projecting end of the rotor, a slot extending radially between the axial housing hollowed in the sleeve and the outer lateral surface of said sleeve, and clamping means tending to bring together the two surfaces which define said slot so as to grip the sleeve elastically around the end concerned of the rotor.

It is thus possible to slip the sleeve over the rotor by screwing it freely on the latter, and then to lock it in position by the clamping means.

To obtain sufficient locking of the sleeve on the rotor, the sleeve extends preferably over at least one pitch of the helix of the rotor.

Again for the purpose of ensuring the mutual locking of the rotor and the sleeve, even on the transmission of high torques, provision is made for the axial housing of the coupling sleeve to be obturated by a front wall on the side of the free end of the latter, and for the end of the rotor to be in abutment against said front wall.

To further perfect the connection between the rotor and the sleeve, supplementary connecting means are provided to fasten the end of the rotor and the sleeve to one another, said means comprising advantageously at least one screw passing through the front end wall of the sleeve and screwed axially into the end of the rotor.

In a preferred embodiment of the device of the invention, the sleeve forms an integral part of a coupling device, particularly a cardan coupling device.

The invention will be better understood on reading the description which follows of one of its preferred embodiments given solely by way of illustrative example, but which is in no way limiting. In this description, reference is made to the accompanying drawing in which:

FIG. 1 is a partial diagrammatic and side view, in section, of a gear pump arranged in accordance with the invention, and FIG. 2 is a view in cross-section along the line II—II of FIG. 1.

As is shown in FIG. 1, the gear pump or Moineau pump 1 comprises conventionally a stator 2 hollowed axially by a cavity 3 wound in a double helix and a helicoidal rotor 4 wound in a single helix and arranged in the cavity 3 of the rotor 2.

When the transverse dimension or diameter d of the rotor is relatively small and simultaneously the depth of the undulation of the helix of the rotor is relatively large, the part of the rotor useful for the transmission of forces—that is to say the central cylindrical region of revolution of diameter e enveloped by the bottoms of the undulations—is of too small a diameter and hence of too little strength.

According to the invention, the rotor 4 is extended beyond the stator by one end 5 identical in all respects with the portion of the rotor 4 housed in the cavity 3, that is to say the helix of the rotor is continuous over the projecting end 5.

Around the projecting end 5 of the rotor is arranged a metal sleeve 6, for example, externally a cylinder of revolution, and hollowed internally by an axial housing 7 of shape entirely complementary with that of the rotor, that is to say, the housing 7 is hollowed in a helix of the same characteristic as that of the rotor 4. To obtain good fastening of the sleeve to the rotor, it is desirable for the sleeve to extend, axailly, over at least one pitch of the helix of the rotor.

Thus, the forces are transmitted by the outer surface of the rotor and no longer simply by its central region, which permits, without modifying the characteristics of the rotor, an increase in the limit of the forces transmissible.

In addition, to facilitate the positioning of the sleeve on the rotor or its dismounting, provision is made for the sleeve to be slotted longitudinally by a radial slot 8 opening, on one side, on the outer surface of the sleeve and, on the other side, into the housing 7, the two facing edges of the slot 8 being slightly separated elastically from one another. Once the sleeve is positioned over the end 5, the sleeve can be brought to grip the rotor firmly under the action of suitable clamping means, for example, bolts 9 engaged in transverse threaded holes 10 hollowed in the sleeve.

To further improve the fastness of the connection between rotor and sleeve, additional connecting means are provided. For this purpose, the end of the sleeve 6 situated facing the free end of the rotor 4 is closed by a front wall against the inner surface of which the free end of the rotor is supported. This front wall 11 is in addition pierced by an axial hole 12 traversed by a bolt for a screw 13 screwed axially into the rotor 4.

Of course, the sleeve 6 can be arranged in any suitable manner in order to be coupled to a neighboring member.

For example, as shown in FIG. 1, the sleeve 6 is constituted by a single part with a head portion 14 of a cardan coupling 15 with a view to rotary connection with another rotary member such as a drive shaft 16 or another Moineau pump rotor.

As is self-evident and as emerges moreover already from the preceding description, the invention is in no way limited to those of its types of application and embodiments which have been more especially envisaged; it encompasses, on the contrary, all modifications.

I claim:

1. In a Moineau gear pump comprising a stator having an axial cavity, a helicoidal rotor axially extending inside said cavity of the stator, and coupling means to couple the rotor to another driving or driven rotary member, the improvement wherein the helicoidal rotor projects axially out of said cavity of the stator and wherein the coupling means comprises a rigid and elongated coupling sleeve provided with an axial hollow whose shape is complementary to that of the helix of the rotor, said sleeve being engaged on and gripping the end of the rotor projecting from said cavity of the stator.

2. Gear pump according to claim 1, wherein the sleeve is provided with a slot extending radially between the axial hollow of said sleeve and the outer lateral surface of said sleeve, and wherein there are provided clamping means tending to bring together the two surfaces which bound said slot so as to grip the sleeve elastically around said end of the rotor.

3. Gear pump according to claim 1, wherein the sleeve extends over at least one pitch of the helix of the rotor.

4. Gear pump according to claim 1, wherein the axial hollow of the coupling sleeve is obturated by a front wall on the side of the free end of the latter, and wherein the end of the rotor is in abutment against said front wall.

5. Gear pump according to claim 1, wherein supplementary connecting means are provided to make fast to one another the end of the rotor and the coupling sleeve.

6. Gear pump according to claim 4, wherein supplementary connecting means are provided to make fast to one another the end of the rotor and the coupling sleeve, said supplementary connecting means comprising at least one screw passing through the sleeve end front wall and screwed axially into the end of the rotor in abutment against the wall.

7. Gear pump according to claim 1, wherein the sleeve forms an integral part of a coupling device, particularly of a cardan coupling device.

8. Gear pump according to claim 1, wherein the sleeve is metallic.

* * * * *